(12) United States Patent
Tsujino et al.

(10) Patent No.: US 6,327,814 B1
(45) Date of Patent: Dec. 11, 2001

(54) APPARATUS AND METHOD FOR ATTACHING A HARD DISK DRIVE TO A PERSONAL COMPUTER SYSTEM

(75) Inventors: Hitoshi Tsujino, Fujisawa; Jun Ishikawa, Yokohama; Katsumasa Nakatsukasa, Fujisawa; Yoshiroh Amano, Yokohama, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/606,852

(22) Filed: Jun. 29, 2000

(30) Foreign Application Priority Data

Jun. 29, 1999 (JP) ................................................. 11-183038

(51) Int. Cl.[7] .................................................. H01R 13/64
(52) U.S. Cl. ............................................................ 43/374
(58) Field of Search ............................ 439/152–160, 439/556, 559, 79–80; 360/77.04

(56) References Cited

U.S. PATENT DOCUMENTS

| | | | |
|---|---|---|---|
| 5,262,759 | * | 11/1993 | Moriconi . |
| 5,454,080 | * | 9/1995 | Fasig et al. ........................... 395/283 |
| 5,865,651 | * | 2/1999 | Dague et al. . |
| 5,867,340 | * | 8/2000 | Morehouse et al. .............. 360/77.04 |
| 5,931,697 | * | 8/1999 | Jeong ..................................... 439/556 |
| 6,045,366 | * | 4/2000 | Motomu ................................... 439/64 |
| 6,109,933 | * | 8/2000 | Lenoir et al. ........................... 439/79 |
| 6,164,982 | * | 12/2000 | Hama ..................................... 439/73 |

* cited by examiner

*Primary Examiner*—Neil Abrams
*Assistant Examiner*—J. F. Duverne
(74) *Attorney, Agent, or Firm*—Robert B. Martin; Bracewell & Patterson, L.L.P.

(57) ABSTRACT

A hard disk drive has a base bottom surface and a male connector to which at least one protruding pin is attached. The pin has a longitudinal axis that is substantially parallel to the base bottom surface and is exposed toward the base bottom surface. A female connector cover portion covers at least a portion of a plane above a female connector. The plane is substantially parallel to the base bottom surface. The pin of the male connector is inserted into a pin-receiving portion of the female connector by guiding the base bottom surface along and on an insert-guidance surface. The female connector is mounted on the insert-guidance surface and has at least one pin-receiving portion corresponding to the pin of the male connector so that the pin of the male connector can be received. The female connector cover functions as a forcible guide in mounting the hard disk drive to prevent damage at the external interface between the pins of the male connector and its mounting location.

3 Claims, 14 Drawing Sheets

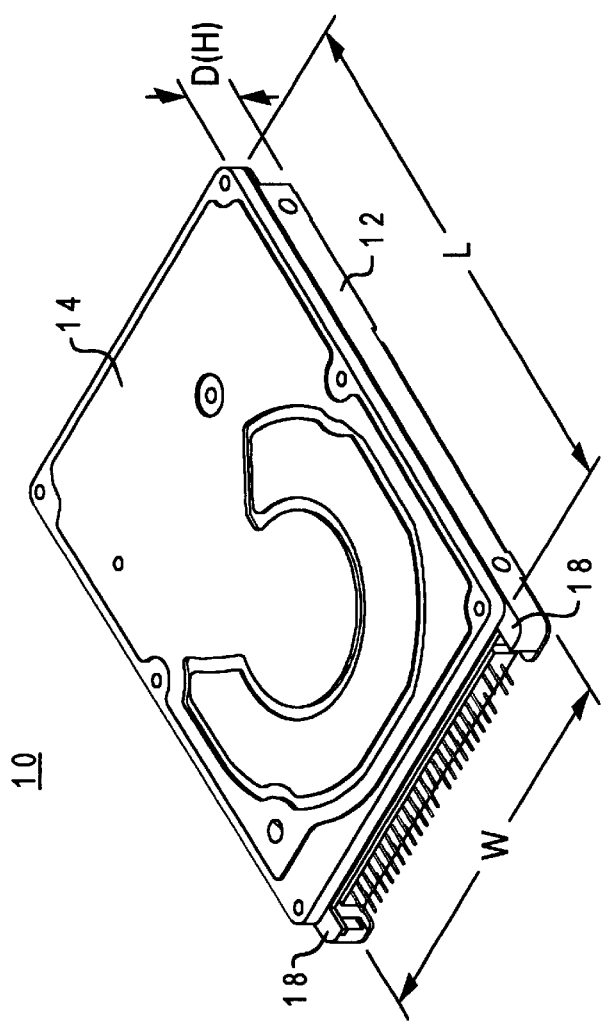
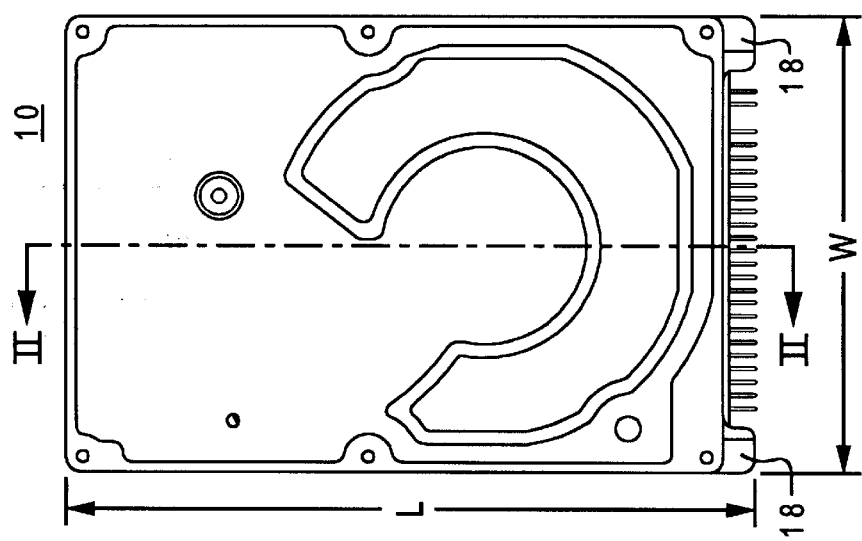
Fig. 1A
Fig. 1B
Fig. 1C
Fig. 1D

Case of 3 disks with a height of 12.7 mm

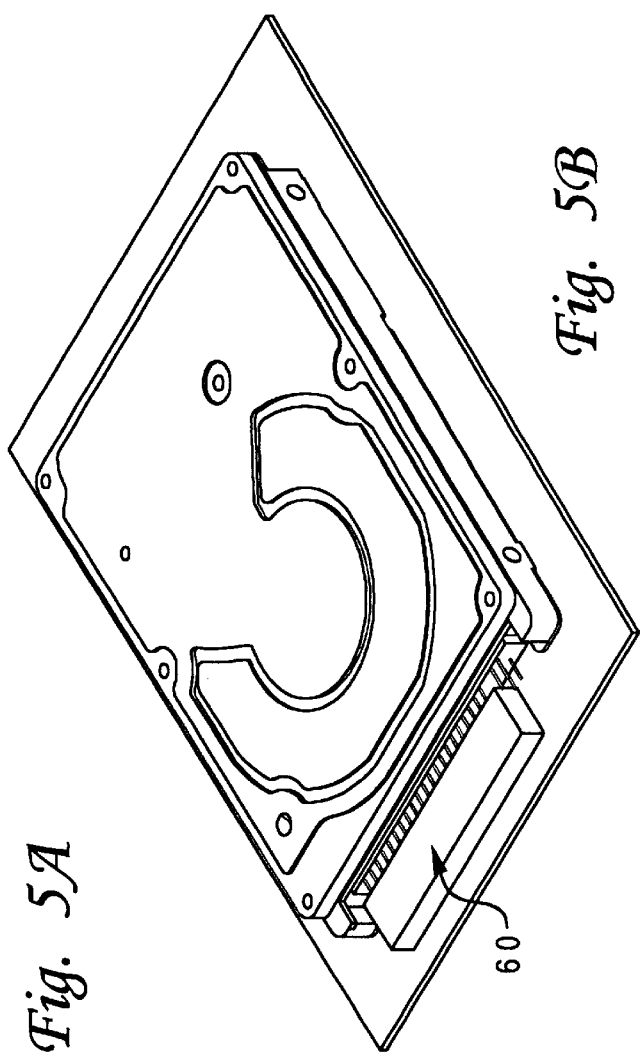
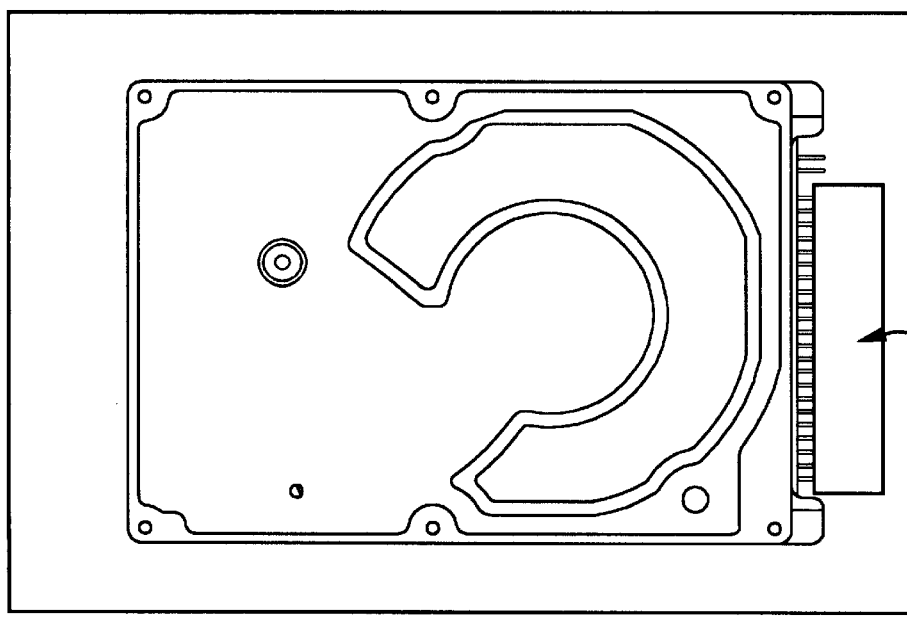

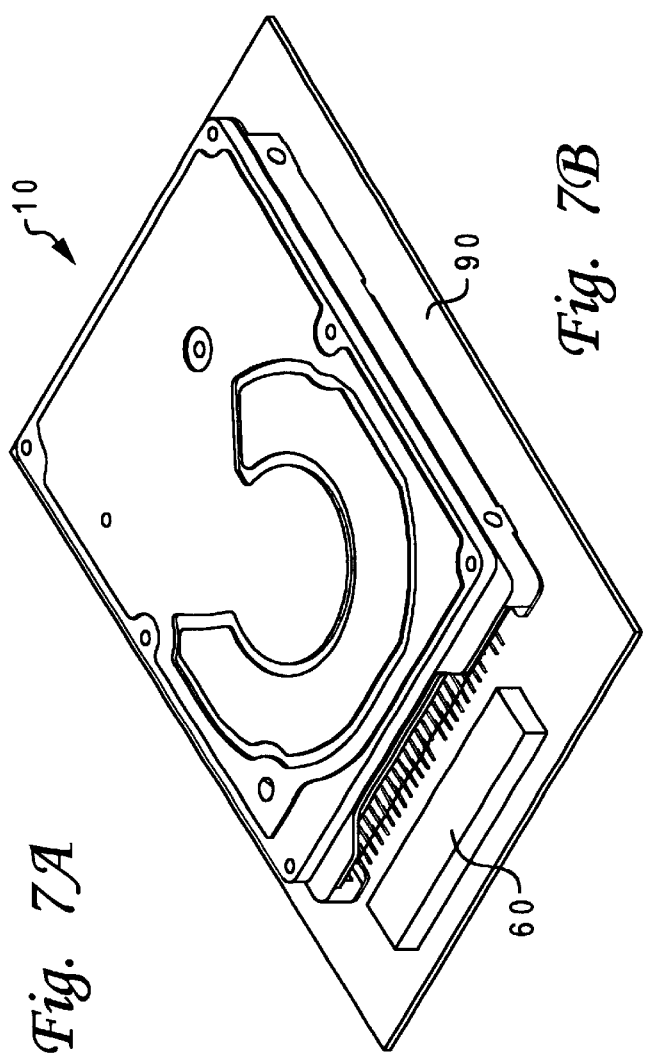
Fig. 7A
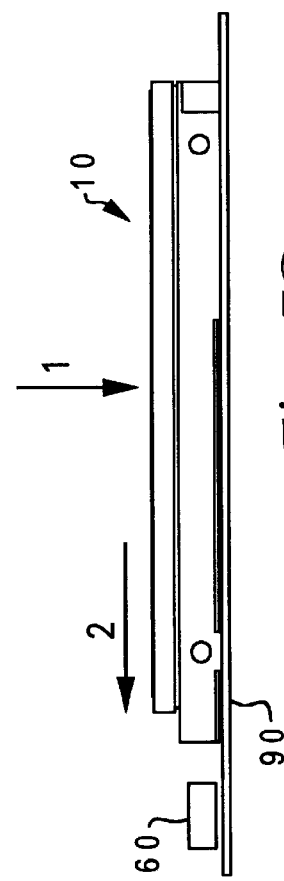
Fig. 7B
Fig. 7D
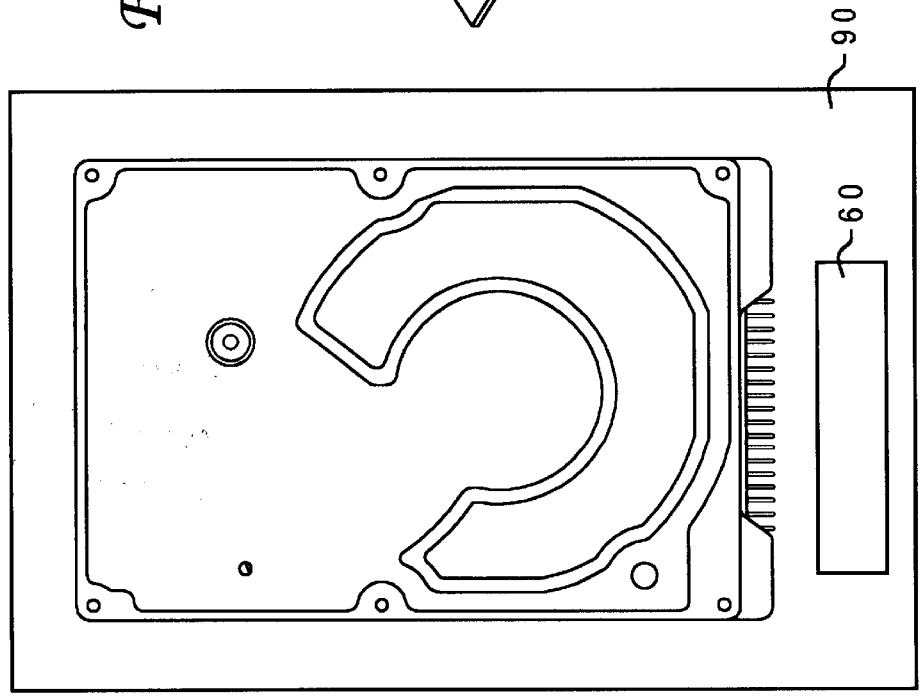
Fig. 7C

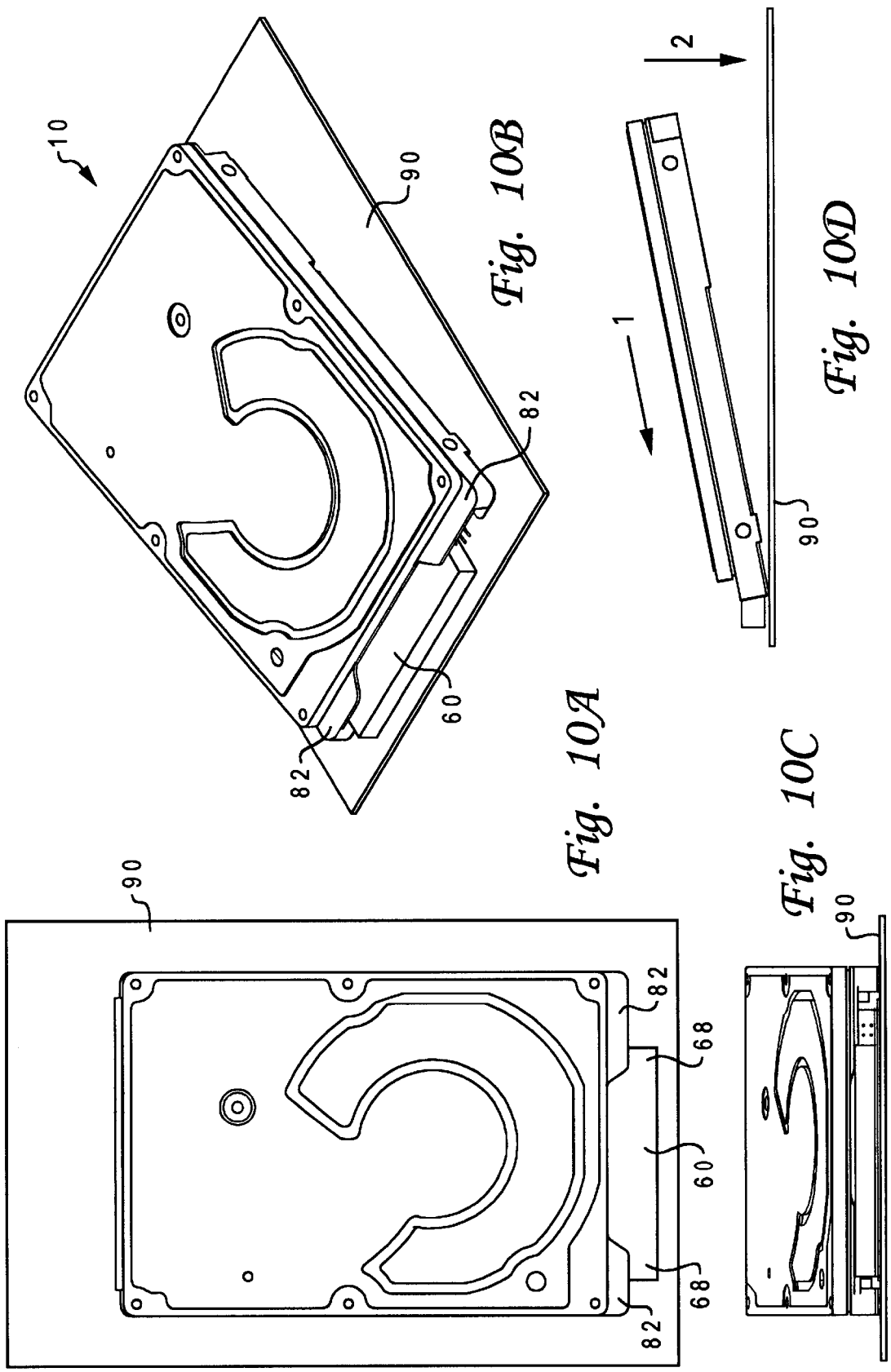

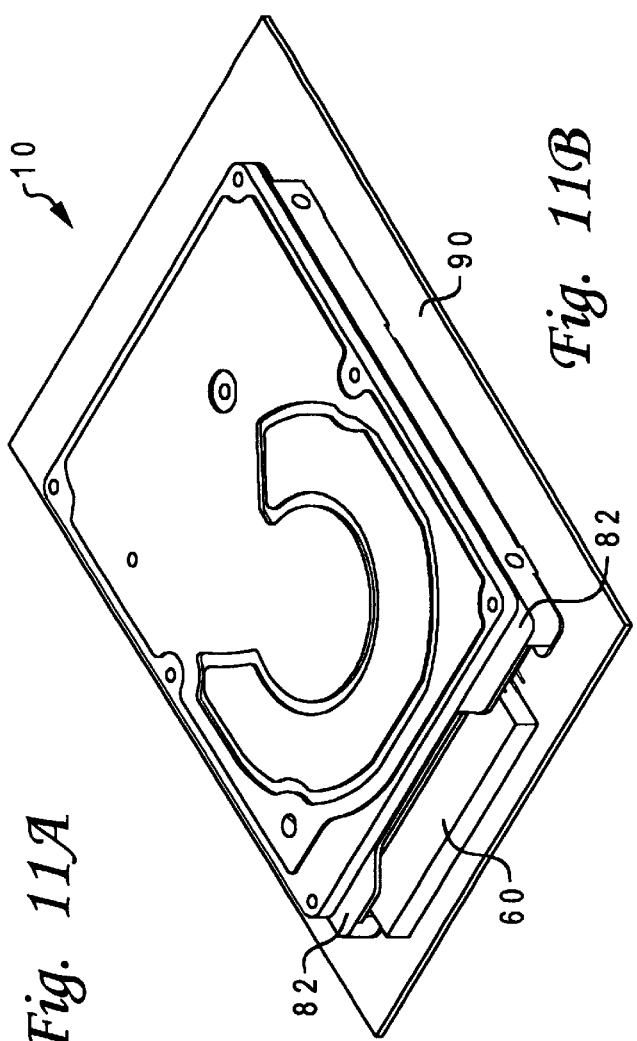
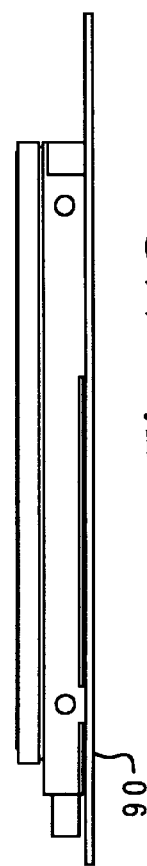
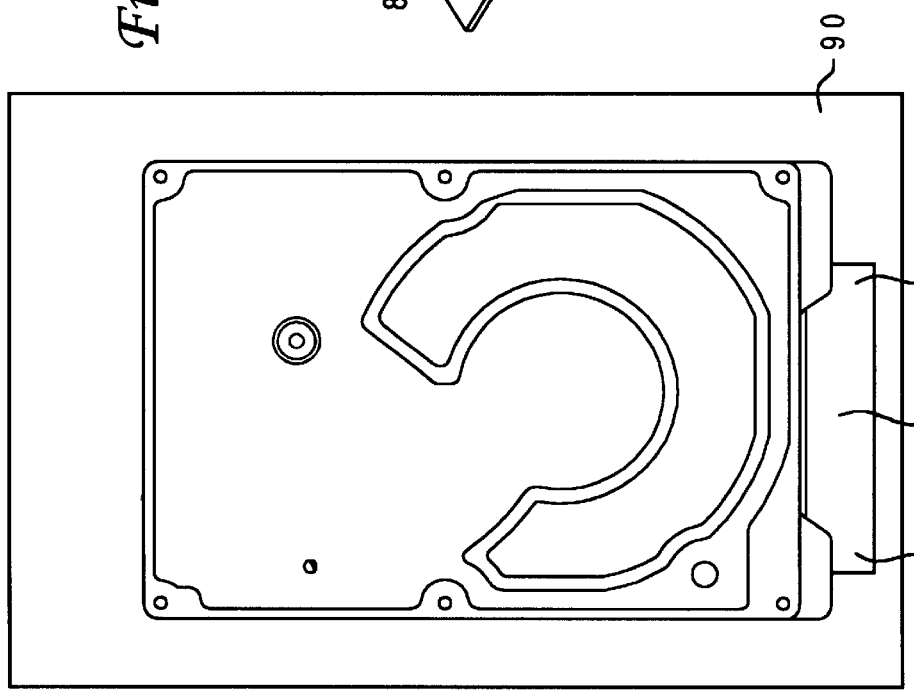
Fig. 11A
Fig. 11B
Fig. 11C
Fig. 11D

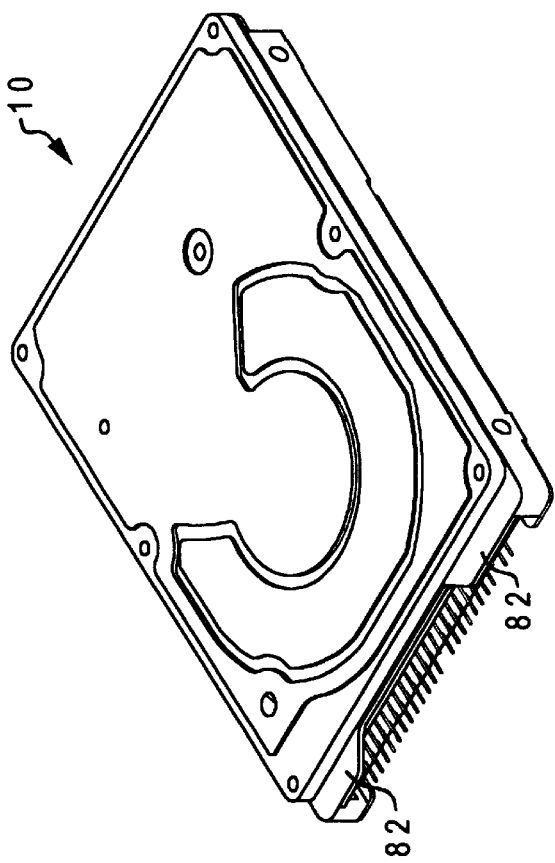
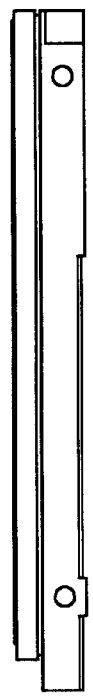
*Fig. 12B*
*Fig. 12D*
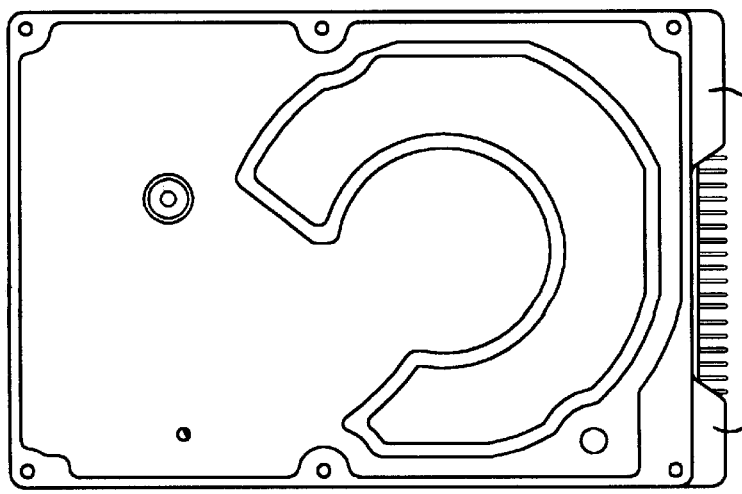
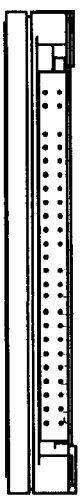
*Fig. 12A*
*Fig. 12C*

APPARATUS AND METHOD FOR ATTACHING A HARD DISK DRIVE TO A PERSONAL COMPUTER SYSTEM

BACKGROUND OF THE INVENTION

1. Technical Field

This invention relates generally to a hard disk drive, and more particularly to a mechanism for preventing damage to an external interface between the pins of a connector and the mounting location of the connector.

2. Description of the Related Art

As the size of hard disk drives continues to decrease, it has become increasing difficult to prevent damage to an external interface between the pins of a connector and the mounting location of the connector. In particular, there is a need to provide a mechanism that forcibly guides hard disk drives when they are mounted in personal computer systems.

SUMMARY OF THE INVENTION

A hard disk drive has a base bottom surface and a male connector to which at least one protruding pin is attached. The pin has a longitudinal axis that is substantially parallel to the base bottom surface and is exposed toward the base bottom surface. A female connector cover portion covers at least a portion of a plane above a female connector. The plane is substantially parallel to the base bottom surface. The pin of the male connector is inserted into a pin-receiving portion of the female connector by guiding the base bottom surface along and on an insert-guidance surface. The female connector is mounted on the insert-guidance surface and has at least one pin-receiving portion corresponding to the pin of the male connector so that the pin of the male connector can be received. The female connector cover functions as a forcible guide in mounting the hard disk drive to prevent damage at the external interface between the pins of the male connector and its mounting location.

DESCRIPTION OF THE DRAWINGS

FIG. 1 includes a plan view (FIG. 1C), a top view (FIG. 1A), a side view (FIG. 1D), and a perspective view (FIG. 1B) of a hard disk drive 10;

FIG. 5 includes a front view (FIG. 5C), a top view (FIG. 5A), a side view (FIG. 5D), and a perspective view (FIG. 5B) of a male connector 20 on the hard disk drive 10 fitted into the female connector 60 through the insert-guidance surface 90;

FIG. 7 depicts multiple views of the male connector 20 on the hard disk drive 10 being correctly inserted into the female connector 60;

FIG. 10 depicts multiple views of the male connector 20 on the hard disk drive 10 being erroneously inserted into the female connector 60;

FIG. 11 depicts multiple views of the male connector 20 on the hard disk drive 10 being correctly inserted into the female connector 60;

FIG. 12 depicts multiple views of the hard disk drive 10 as a single body including a plate protrusion 82;

DESCRIPTION OF THE PREFERRED EMBODIMENT

FIG. 1 includes a plan view (FIG. 1C), a top view (FIG. 1A), a side view (FIG. 1D), and a perspective view (FIG. 1B) of a hard disk drive (HDD) 10. The external form of the hard disk drive (HDD) 10 is formed by a base 12, which becomes a foundation at the lower side, and a cover 14 which covers the base 12 from above. The external form of the hard disk drive (HDD) 10 is within standard requirements that can be expressed in terms of three factors: a longitudinal direction L, a width W, and a depth D (or height H). These factors are standardized in consideration of and for the convenience of attachment to other systems. In the design of the HDD 10, the space restricted by the form factors must be utilized efficiently.

Figure 2:
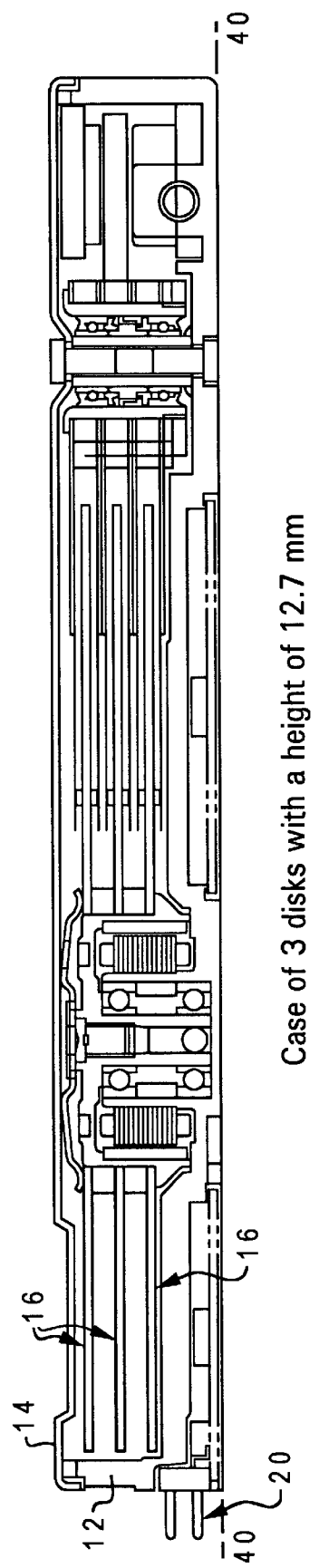
FIG. 2 is a sectional view taken along the line II—II in the top view of FIG. 1A.

FIG. 2 is a sectional view taken along line II—II in the top view of FIG. 1 and shows the internal structure of the hard disk drive (HDD) 10. Typically, a plurality of stacked disks 16 are disposed such that they are rotatable with respect to the base 12. A male connector 20 is disposed for external interface with an external system.

Figure 3:
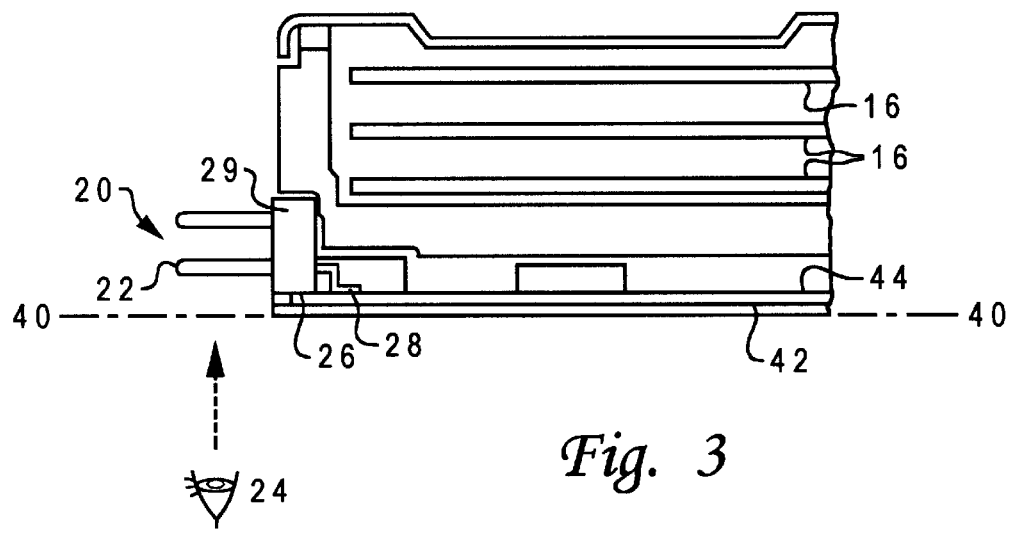
FIG. 3 is an enlarged view showing a left-side portion of FIG. 2.

FIG. 3 is an enlarged view showing part of FIG. 2. The male connector 20 includes at least one protruded pin. In FIG. 1, a plurality of pins are disposed, the pins being arrayed in a direction of pin array across the direction of width W and in two stages in the direction of depth D (or in the direction of height H). When the hard disk drive (HDD) 10 is at a standstill on a plane, in the direction of depth D (or in the direction of height H) the plane becomes the base bottom surface 40.

At least one protruded pin is exposed in a direction going to the base bottom surface 40 of the hard disk drive (HDD) 10. Of course, there are cases where the pin is not entirely exposed but only the pointed end of the pin is exposed partially. That is, if even a portion of the pin is exposed, the pin can be observed by viewing it in the direction of observation position 24 from the bottom of the hard disk drive (HDD) 10. The pins of the male connector 20 protrude and are in a relatively long and narrow form. Therefore, even if a portion including the pointed end is partially exposed, disadvantageously, there is originally a possibility that the pin itself will be caused to bend. Thus, it is desirable to protect the connector pins by some method.

In FIG. 3, the reason that the pins are exposed is also related to the fact that the space confined within the form-factor standardization has to be utilized. In an HDD thinned in the direction of depth D (or the direction of height H), the male connector 20 is caused to move in the direction going to the base bottom surface 40, in order to ensure a space for disposing a plurality of stacked disks 16 and ensure the-wall thickness of the base 12.

In such a case, it is considered that a protective wall protruded in the longitudinal direction of the pins is provided to surround the pins a predetermined distance away from the pins. In practice, there is a conventional technique of providing such a protective wall for the male connector itself. However, considering the circumstance that two-stage pins alone occupy a substantial space in the direction of depth D (or the direction of height H), further considering that the thickness of the protective wall is added to the depth of the two-stage pins, and finally considering that disks are disposed above the protective wall, the male connector with the protective wall cannot be utilized when a thinned HDD is desired to be realized. In particular, it is difficult to provide the protective wall in the direction going to the base bottom surface 40 is apparent from the fact that the base bottom surface 40 closes in just under the connector.

In the typical example of FIG. 3, the base bottom surface 40 is formed as the bottom of a HDD printed-circuit board 42. In such a case, the hard disk drive (HDD) printed-circuit board 42 is mounted in parallel to the base bottom surface 40. In the example of FIG. 3, the male connector 20 is mounted on this hard disk drive (HDD) printed-circuit board 42. The mounting portion 26 of the male connector 20 is fixed, for example, by adhesion, or it is fixed, for example, depending upon the strength of the soldering between a wire and the hard disk drive (HDD) printed-circuit board 42. The connected point 28 between a wire from the male connector 20 and a wire from the hard disk drive (HDD) printed-circuit board 42 is, for example, soldered.

There is a possibility that the base bottom surface 40 will be the bottom itself of the base 12 It is possible to mount the male connector 20 directly on the base 12. It is also possible to substitute the base 12 itself for the molded portion 29 of the male connector 20. Even if the base 12 were made of metal, it could be utilized by covering it with an insulating material. Also, even if the base 12 were made of a plastic material, it could be utilized.

When external force is exerted on the pins 22, the external force is also transmitted to the mounting portion 26 of the male connector 20 and to the connected point 28 between a wire from the male connector 20 and a wire on the hard disk drive (HDD) printed-circuit board 42. There are cases where such external force damages the mounting portion 26 of the male connector 20 and the connected point 28 and also damages the molded portion 29 of the male connector 20. In the worst case, such external force separates or breaks a wiring pattern 44 provided on the hard disk drive (HDD) printed-circuit board 42, through the connected point 28 between a wire from the male connector 20 and a wire on the hard disk drive (HDD) printed-circuit board 42.

Figure 4A:
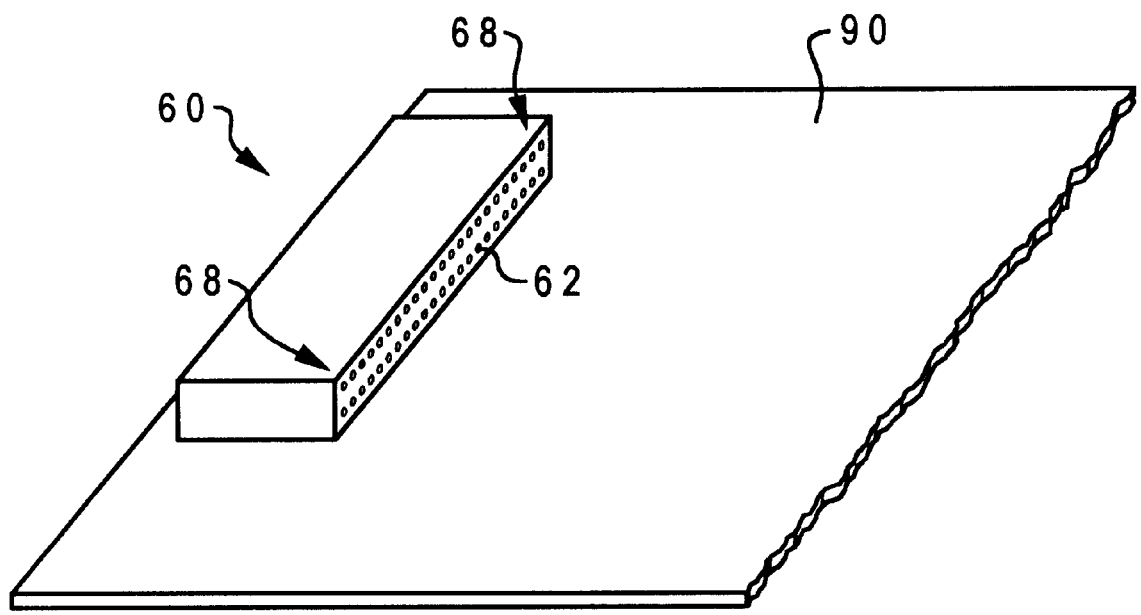
FIG. 4 includes a perspective view (FIG. 4A) and a side view (FIG. 4B) of a female connector 60 mounted on an insert-guidance surface 90.
Figure 4B:
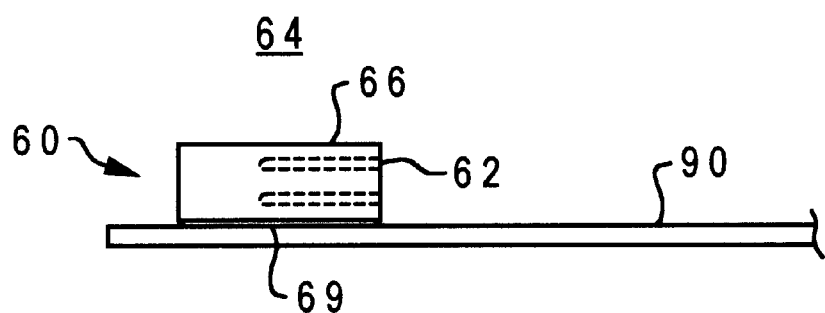
Figure 6B:
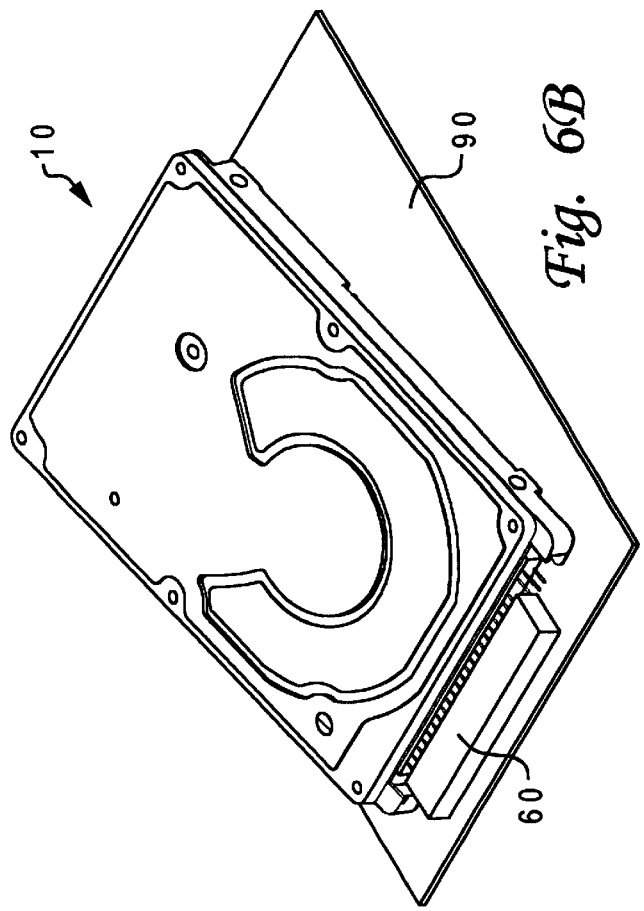
FIG. 6 depicts multiple views of the male connector 20 on the hard disk drive 10 being erroneously inserted into the female connector 60.
Figure 6D:
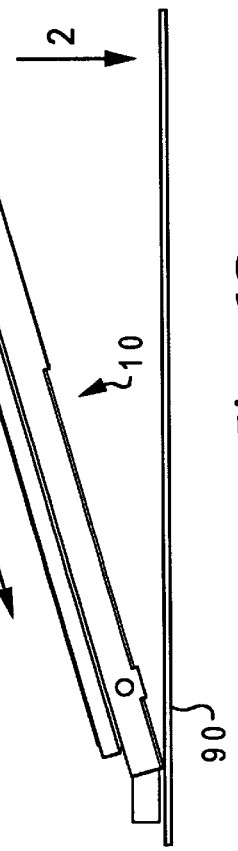
Figure 6A:
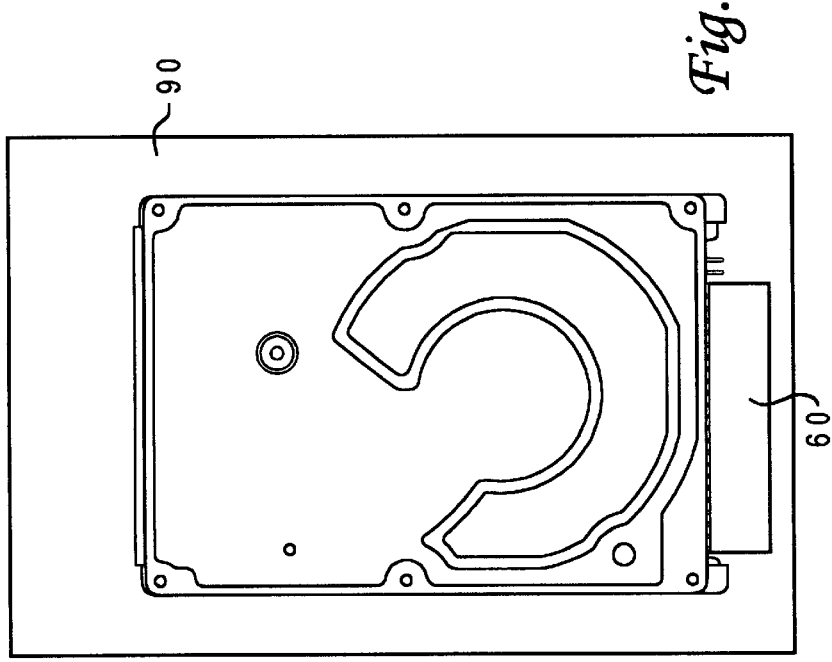
Figure 6C:
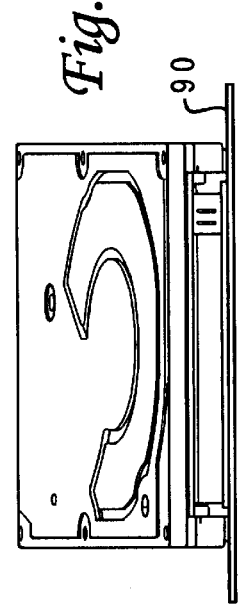

FIG. 4, which includes a perspective view (FIG. 4A) and a side view (FIG. 4B), illustrates a female connector 60 mounted on an insert-guidance surface 90. The female connector 60 is fixed with respect to the insert-guidance surface 90 by either adhesion or soldering. The female connector 60 is a connector corresponding to the male connector 20 and therefore has pin-receiving portions 62 corresponding to the pins 22. A plurality of pin-receiving portions 62 are disposed corresponding to a plurality of pins 22 in FIG. 1. Similarly, in the female connector 60, the pin-receiving portions 62 are arrayed in a direction of pin array equivalent to the direction of width W of FIG. 1 and in two stages in a direction equivalent to the direction of depth D (or the direction of height H).

In the male connector 60, there is substantially no occurrence of a disadvantage such that pins bend, because there is no protruded portion, unlike the case of the pins 22 of the male connector 20. However, in the case where the pins 22 of the male connector 20 have been inserted into the pin-receiving portions 62 of the female connector 60, when external force is exerted on the hard disk drive (HDD) 10, the external force is transmitted to the pin-receiving portions 62 through the pins 22 and is finally exerted on the mounting portion 69 of the female connector 60 as a concentrated force.

FIG. 5, which includes a front view (FIG. 5C), a top view (FIG. 5A), a side view (FIG. 5D), and a perspective view (FIG. 5B), illustrates an ideal process that the male connector 20 on the hard disk drive (HDD) 10 side is fitted into the female connector 60 through an insert-guidance surface 90. FIG. 5 illustrates the state that the base bottom surface 40 of the hard disk drive (HDD) 10 shown in FIG. 1 is at rest on the insert-guidance surface 90 of FIG. 4. In FIG. 5, the pins 22 of the male connector 20 are partially inserted into the pin-receiving portions 62 of the female connector 60, the connection between the male connector 20 and the female connector 60 being just completed. However, as described supra, this state is in a half-inserted state and is therefore in a high dangerous state of bending the pins 22.

FIG. 6 is a diagram showing the step that the male connector 20 on the hard disk drive (HDD) 10 side is erroneously inserted into the female connector 60. Here, a front view, a top view, a side view, and a perspective view are shown. In erroneous insertion, as shown in the figures, the male connector 20 is first inserted in the direction of arrow 1. Then, if the male connector 20 is moved in the direction of arrow 2, the base bottom surface 40 will rest on the insert-guidance surface 90.

In such a case, the male connector 20 is inserted in the direction of arrow 1, so that the pins 22 of the male connector 20 are not correctly inserted into the pin-receiving portions 62 of the female connector 60. Therefore, the pointed ends of the pins 22 of the male connector 20 will undergo external force excessively and bend. In addition, if the male connector 20 is moved in the direction of arrow 2 with the upper pins 22 of the male connector 20 halfway inserted in the upper pin-receiving portions 62 of the female connector 60, the upper pins 22 of the male connector 20 will be bent largely by a considerably strong force (moment of rotation produced by external force in the direction of arrow 2).

FIG. 7 is a diagram showing the step that the male connector 20 on the hard disk drive (HDD) 10 side is correctly inserted into the female connector 60. In correct insertion, the base bottom surface 40 is first placed in the direction of arrow 1 such that the base bottom surface 40 rests on the insert-guidance surface 90. Then, the base bottom surface 40 is moved along the insert-guidance surface 90 in the direction of arrow 2.

As will be appreciated from the foregoing description, it is desirable that a correct insertion step be forcibly performed as shown in FIG. 7. In other words, when the base bottom surface 40 is not moved along the insert-guidance surface 90 in the direction of arrow 2, it is desirable to prevent the insertion of the pins 22 of the male connector 20 into the pin-receiving portions 62 of the female connector 60.

FIG. 8 includes FIGS. 8A to 8D, which are conceptual diagrams showing embodiments of a female connector cover portion 80. The female connector cover portion 80 prevents the pins 22 of the male connector 20 from being inserted into the pin-receiving portions 62 of the female connector 60 when the base bottom surface 40 is not moved along and on the insert-guidance surface 90. In each case of FIGS. 8A to 8D, the right figure supposes insertion in an oblique direction such as arrow 1 in FIG. 6.

Figure 8A:
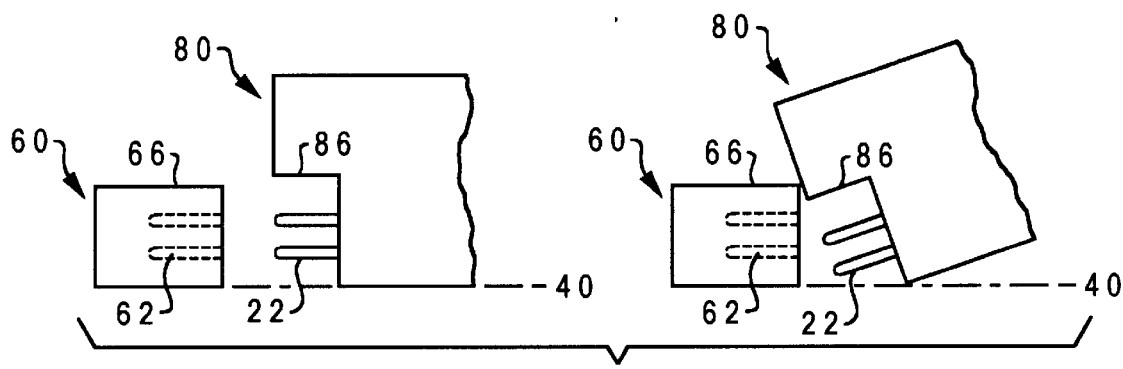
FIG. 8 shows various embodiments of a female connector cover portion 80, wherein each of the drawings on the right sides illustrate insertion in an oblique direction such as arrow 1 of FIG. 6.

In the case of FIG. 8A, the lower surface 86 of the female connector cover portion 80 is provided such that it is substantially coincident with the upper surface 66 of female connector 60. That is, as shown in the right figure, if the lower surface 86 and the upper surface 66 do not correctly engage each other in parallel, insertion in an oblique direction will be prevented at the inlet. In this case of FIG. 8A, if the engagement tolerance between the lower surface 86 and the upper surface 66 is made severe, the lower surface 86 and the upper surface 66 can be used as a mechanism for fairly forcibly guiding movement in the direction of arrow 2 in FIG. 7.

Figure 8B:
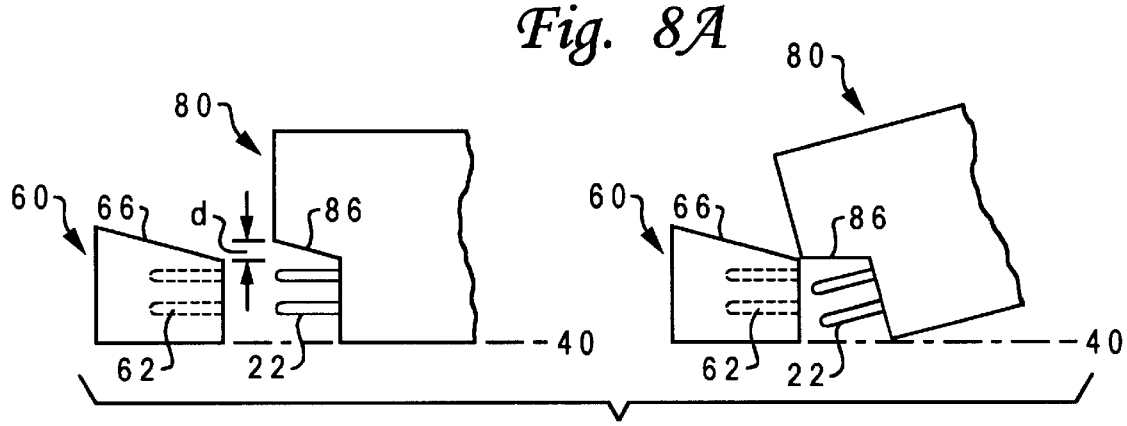

In the case of FIG. 8B, the lower surface 86 of the female connector cover portion 80 is provided such that it is substantially coincident with the upper surface 66 of female connector 60, the lower surface 86 and the upper surface 66 being obliquely provided in parallel with each other. Note that, as shown in the right figure, among oblique insertions, the insertion up to a relatively gentle angle will be allowed. The reason is that the lower surface 86 is spaced a distance d from the upper surface 66. However, even 1 case of FIG. 8B, it is sure to expect the effect of guidance to some degree. If the pins are completely inserted, the male and female connectors will be firmly fixed by the lower surface 86 and the upper surface 66.

Figure 8C:
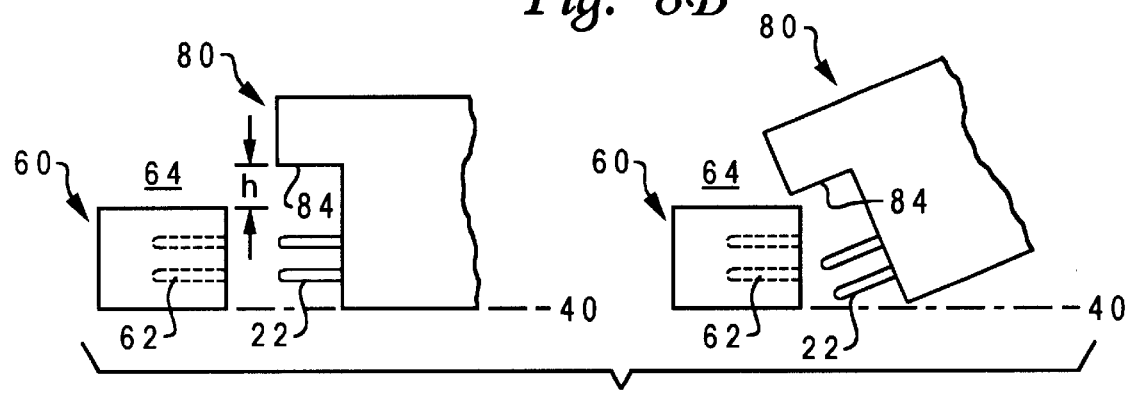

In the case of FIG. 8C, the space 84 under the lower surface 86 of the female connector cover portion 80 is provided such that it substantially corresponds with the space 64 above the upper surface 66 of female connector 60, the lower surface 86 being spaced distance h from the upper surface 66. Note that, as shown in the right figure, among oblique insertions, the insertion up to a fairly sharp angle will be allowed. However, even in the case of FIG. 8C, it is sure to expect the effect of guidance to some degree. Note that after complete insertion, distance h remains held. Therefore, when distance h is large, the fixation between the connectors after insertion cannot be expected.

Figure 8D:
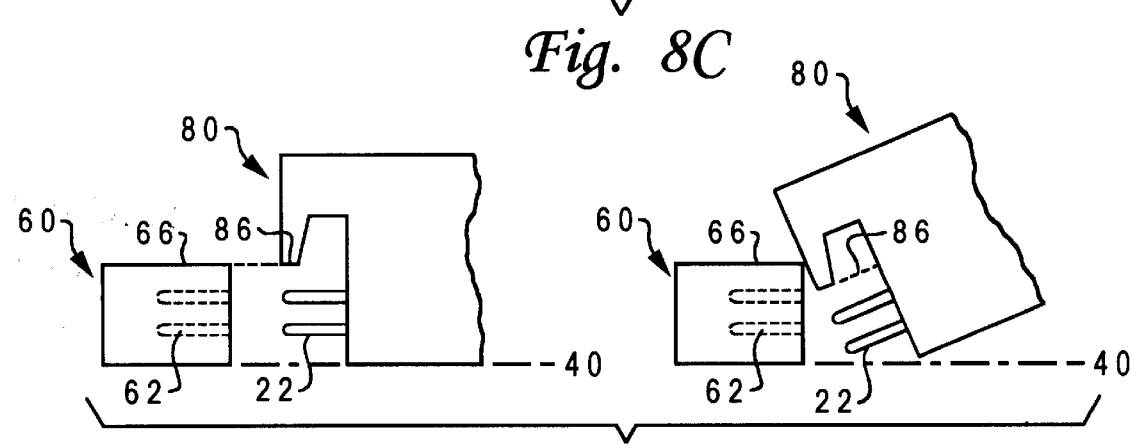

In the case of FIG. 8D, the lower surface 86 of the female connector cover portion 80 is provided such that it is lowered only at its inlet. According to this case of FIG. 8D, substantially the same effect as the case of FIG. 8A can be expected.

In all the cases of FIGS. 8A to D, if the base bottom surface 40 is moved along and on the insert-guidance surface 90, the female connector cover portion 80 makes it possible to cover at least a portion of the plane 64 above the female connector 60 which is substantially parallel to the base bottom surface 40. This "substantially parallel plane" corresponds to a surface, such as the upper surface 66 in the case of FIGS. 8A or D.

Figure 9:
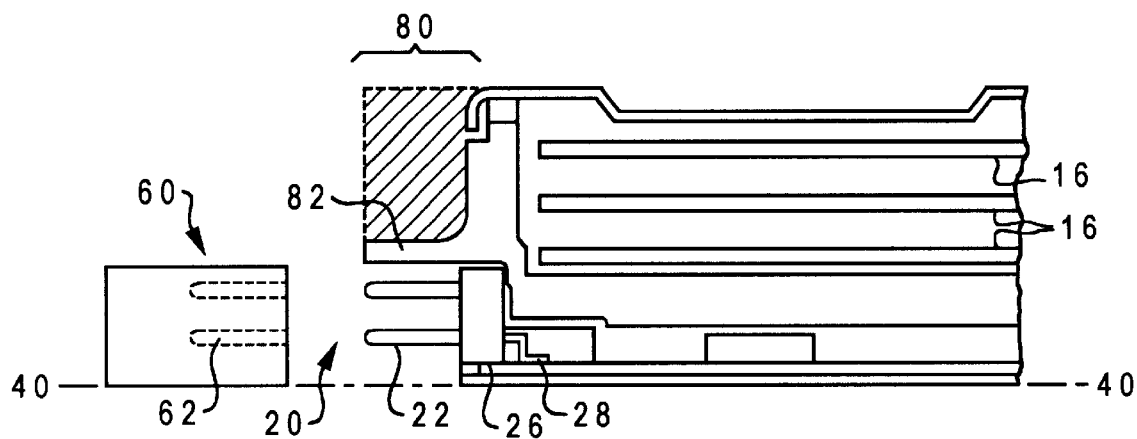
FIG. 9 is a sectional view of the hard disk drive taken along the line II—II of FIG. 1 and showing the female connector cover portion 80 and the female connector 60.

FIG. 9 is a diagram equivalent to a sectional view taken along line II—II in the top view of FIG. 1. The point differing from FIG. 3 is that the female connector cover portion 80 and the female connector 60 are present. If, in FIG. 9, the case of FIG. 8A is applied as it is, the shaded portion of the female connector cover portion 80 will become unnecessary. If even the plate protrusion 82 remains, it will be understood that the same effect as the case of FIG. 8A can be expected. All that are required of this plate protrusion 82 is to protrude along the substantially parallel plane with respect to the base bottom surface 40.

Providing the female connector cover portion 80 like the plate protrusion 82 reduces the number of materials to be used in the hard disk drive (HDD) 10, resulting in a reduction in the weight of the HDD 10. All that is required of the plate protrusion 82 is to protrude in the longitudinal direction of the pins 22 along a substantially parallel plane with respect to the base bottom surface 40, at a predetermined distance from the pins 22 in the direction going away from the base bottom surface 40. Protruding the plate protrusion 82 in this manner is advantageous considering the restriction on the form factor in the direction of depth D (or in the direction of height H).

FIG. 10 is a diagram showing the step that the male connector 20 on the hard disk drive (HDD) 10 side is erroneously inserted into the female connector 60. The point differing from FIG. 6 is that a plate protrusion 82, which is the female connector cover portion 80, is present. Incidentally, as shown in FIG. 10, there are cases where the width of the female connector 60 remains constant compared with the width of the male connector 20. In such cases, if the female connector cover portions 80 are provided in a range such that they cover at least one of both ends 68 of the female connector 60, the female connector cover portions 80 will be a guide indicating the direction of width W. As a result, there is no possibility that insertion in an oblique direction such as arrow 1 in FIG. 6 will be performed and the effect of preventing insertion is sufficiently obtained. In addition to this, weight reduction will become possible.

FIG. 11 is a diagram showing the state that the male connector 20 on the hard disk drive (HDD) 10 side is correctly inserted into the female connector 60.

FIG. 12 is a perspective view of the hard disk drive (HDD) 10 as a single body (including a plate protrusion). The hard disk drive (HDD) 10 here includes plate protrusions 82. As described in FIG. 10, viewing the hard disk drive (HDD) 10 as a single body, the plate protrusions 82 are provided asymmetrically with respect to the direction of width W which is one of the form factors. That is, from the cutout where the plate protrusions 82 are not provided, the pins 22 can be observed to have been exposed, even if the pins 22 are observed perpendicularly with respect to the base bottom surface 40 from above (i.e., from the top surface).

Figure 13:
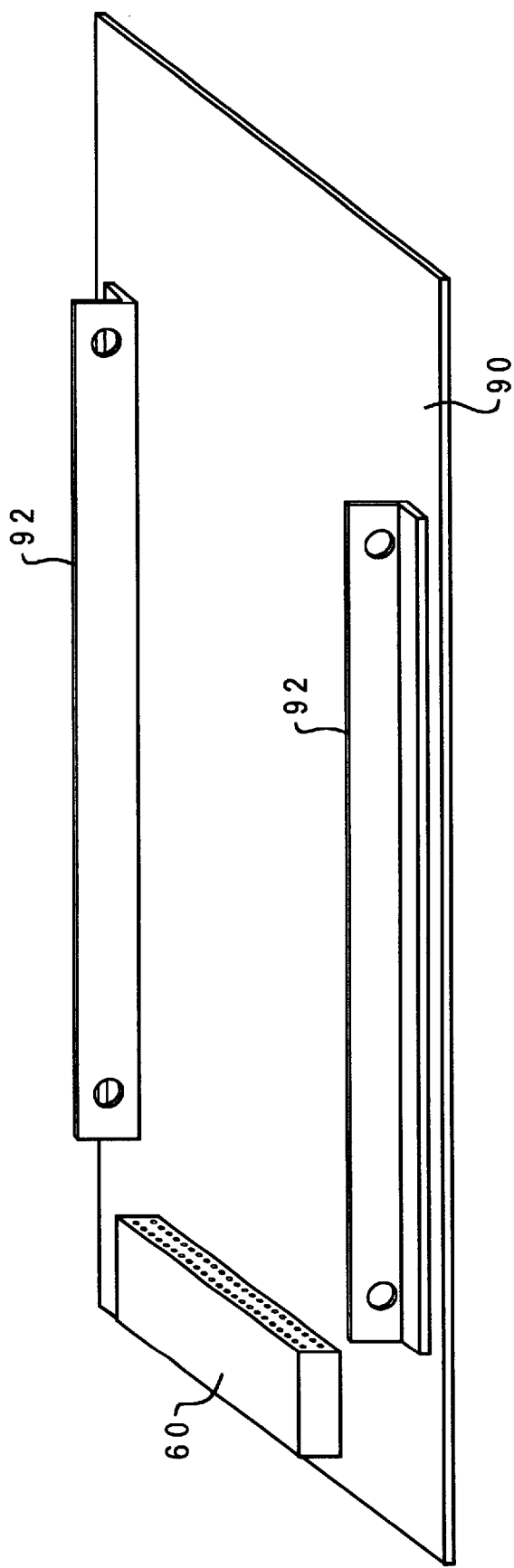
FIG. 13 is a perspective view showing the female connector 60 mounted on an insert-guidance surface 90.

FIG. 13 is a perspective view showing the female connector 60 mounted on the insert-guidance surface 90. The point differing from FIG. 4 is that HDD mounting portions 92 are provided.

Figure 14:
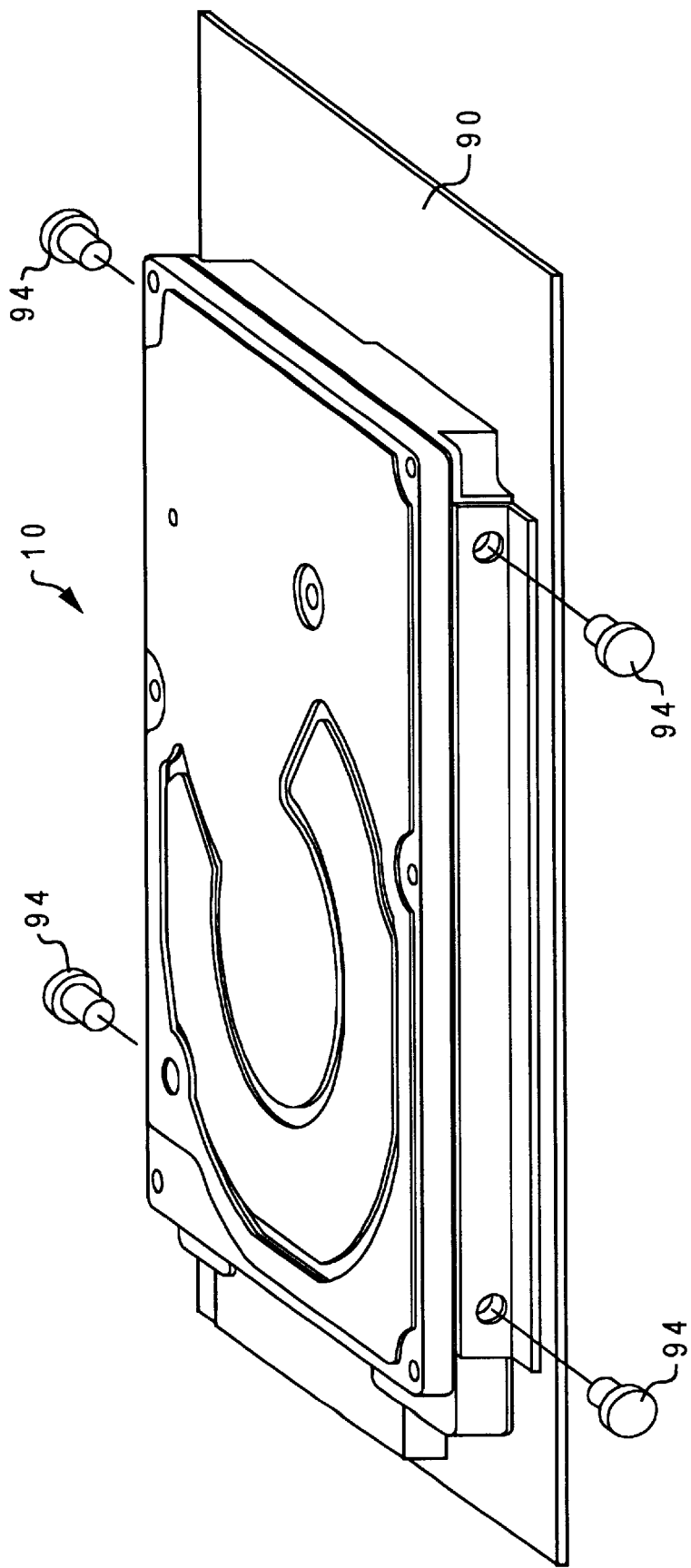
FIG. 14 is a perspective view showing the hard disk drive 10 mounted on the insert-guidance surface 90.

FIG. 14 is a perspective view showing the state that the HDD 10 is mounted on the insert-guidance surface 90. HDD mounting screws 94 can be screwed into the HDD 10 through holes provided in the HDD mounting portions 92. With this, the HDD 10 is perfectly fixed to the HDD mounting portions 92.

Figure 15:
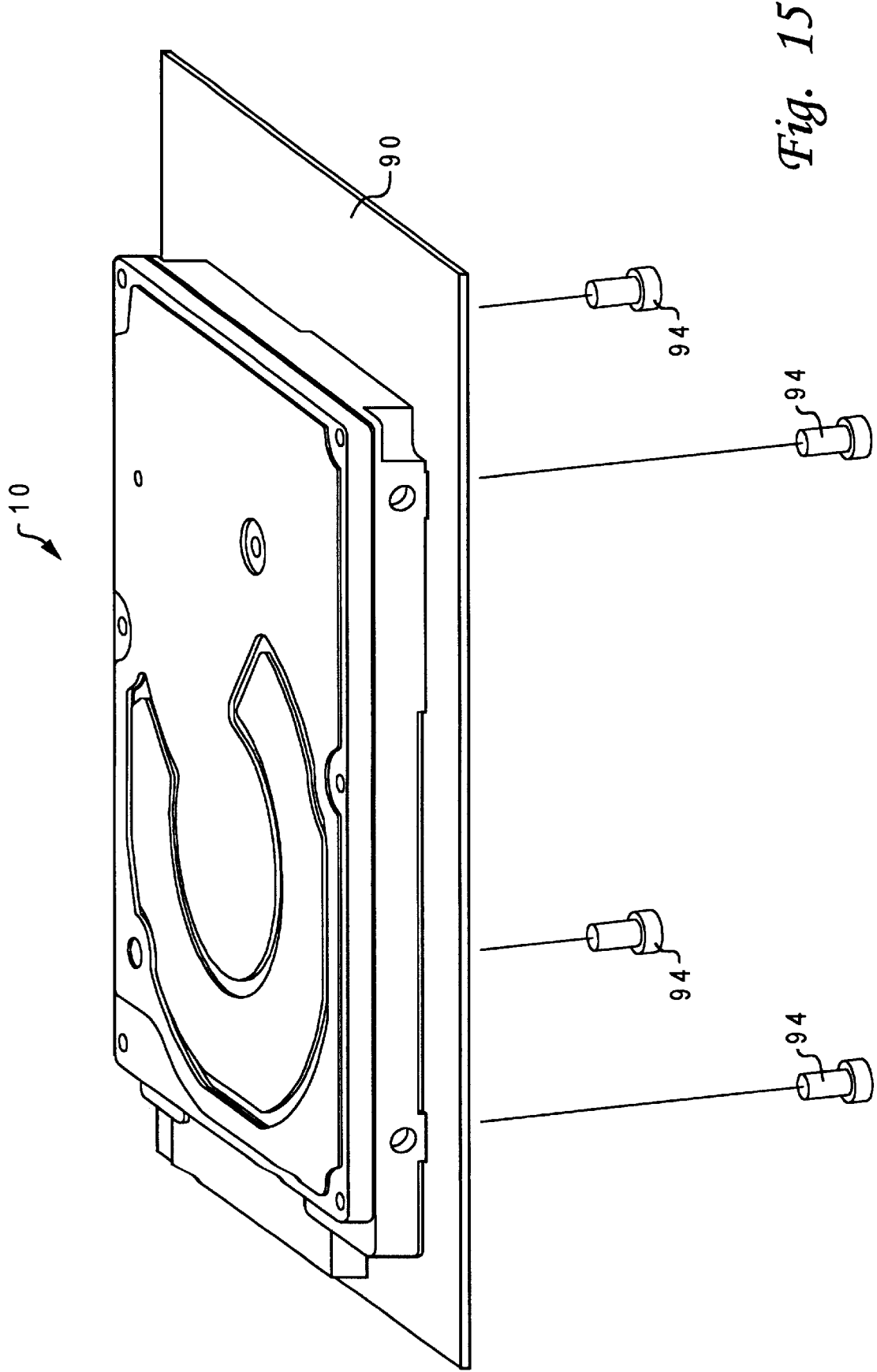
FIG. 15 is an exploded perspective view of the hard disk drive 10 mounted on the insert-guidance surface 90.

FIG. 15 is a perspective view showing the state that the HDD 10 is mounted on the insert-guidance surface 90. HDD mounting screws 94 can be screwed into the base surface 40 of the HDD 10 through holes opened in the insert-guidance surface 90. With this, the HDD 10 is perfectly fixed to the insert-guidance surface 90.

The insert-guidance surface 90 may be provided in a personal computer (PC) system 100 or provided in a system such as a server. It does not always need to be a printed-circuit board provided solely for the purpose of mounting the female connector 60. The insert-guidance surface 90 will be sufficient if it serves as an insert-guidance surface. In addition, the HDD mounting portions 92 shown in FIG. 13 or 14 do not always need to be provided on the insert-guidance surface 90. The to the pins of the connector as an external interface and the connector-mounted place are thereby prevented.

What is claimed is:

1. A hard disk drive, comprising:

a base bottom surface;

a printed-circuit board mounted parallel to said base bottom surface;

a male connector to which at least one protruded pin is attached in a manner that a longitudinal direction of said pin is substantially parallel to said base bottom surface and is exposed toward said base bottom surface; and a female connector cover portion for covering at least a portion of a plane above a female connector, said plane being substantially parallel to said base bottom surface, wherein said female connector cover portion is provided with plate protrusions that are asymmetrical in a direction of a pin array and protrude along said plane substantially parallel to said base bottom surface and cover at least one end of said female connector; wherein when said pin is inserted into a pin-receiving portion of said female connector by guiding said base bottom surface along and on an insert-guidance surface, said female connector is mounted on said insert-guidance surface and has at least one pin-receiving portion corresponding to said pin so that said pin is received by said pin-receiving portion; and wherein said female connector cover portion prevents said pin from being inserted into the pin-receiving portion when said base bottom surface is not moved along and on said insert-guidance surface.

2. A personal computer system, comprising:

a hard disk drive including a base bottom surface and a male connector to which at least one protruded pin is attached in a manner that a longitudinal direction of said pin is substantially parallel to said base bottom surface and is exposed toward said base bottom surface;

a system including an insert-guidance surface and a female connector mounted on an insert-guidance surface and having at least one pin-receiving portion corresponding to said pin of said male connector so that said pin is received by said pin-receiving portion; and wherein said hard disk drive further comprises:

a female connector cover portion for covering at least a portion of a plane above the female connector, said plane being substantially parallel to said base bottom surface, wherein said pin is inserted into the pin-receiving portion by guiding said base bottom surface along and on the insert-guidance surface, wherein said female connector cover portion is provided with plate protrusions that protrude along said plane substantially parallel to said base bottom surface, and said plate protrusions cover at least one end of said female connector; and wherein said female connector cover portion prevents the pin of said male connector from being inserted into the pin-receiving portion of said female connector when said base bottom surface is not moved along and on said insert-guidance surface.

3. A hard disk drive, comprising:

a base bottom surface;

a male connector to which at least one protruded pin is attached in a manner that a longitudinal direction of said pin is substantially parallel to said base bottom surface and is exposed toward said base bottom surface; and plate protrusions protruding in said longitudinal direction of said pin along a plane substantially parallel to said base bottom surface, at a predetermined distance from said pin in a direction going away from said base bottom surface; and wherein said plate protrusions are provided asymmetrically in a direction of a pin array.

* * * * *

UNITED STATES PATENT AND TRADEMARK OFFICE
CERTIFICATE OF CORRECTION

PATENT NO.    : 6,327,814 B1  
DATED         : December 11, 2001  
INVENTOR(S)   : Tsujino et al.

Page 1 of 1

It is certified that error appears in the above-identified patent and that said Letters Patent is hereby corrected as shown below:

<u>Column 6,</u>  
Line 65, add the word -- damage -- between the words "The" and "to."

Signed and Sealed this

Seventh Day of May, 2002

Attest:

JAMES E. ROGAN  
*Attesting Officer*    *Director of the United States Patent and Trademark Office*